US012646286B2

(12) United States Patent
Sakai et al.

(10) Patent No.: US 12,646,286 B2
(45) Date of Patent: Jun. 2, 2026

(54) CASCADE APPROACH TO FEW-SHOT SEMANTIC SEGMENTATION

(71) Applicant: International Business Machines Corporation, Armonk, NY (US)

(72) Inventors: Tomoya Sakai, Tokyo (JP); Takayuki Katsuki, Tokyo (JP); Haoxiang Qiu, Tokyo (JP); Takayuki Osogami, Yamato (JP); Tadanobu Inoue, Yokohama (JP)

(73) Assignee: International Business Machines Corporation, Armonk, NY (US)

( * ) Notice: Subject to any disclaimer, the term of this patent is extended or adjusted under 35 U.S.C. 154(b) by 282 days.

(21) Appl. No.: 18/488,526

(22) Filed: Oct. 17, 2023

(65) Prior Publication Data

US 2025/0124686 A1    Apr. 17, 2025

(51) Int. Cl.
*G06V 10/26* (2022.01)
*G06V 10/764* (2022.01)

(52) U.S. Cl.
CPC ............ *G06V 10/26* (2022.01); *G06V 10/764* (2022.01)

(58) Field of Classification Search
CPC ...... G06V 10/26; G06V 10/764; G06V 10/11; G06V 10/765; G06V 10/809; G06V 20/70
See application file for complete search history.

(56) References Cited

U.S. PATENT DOCUMENTS

2023/0154007 A1    5/2023  Liu et al.
2024/0176819 A1*   5/2024  Yoo ...................... G06F 16/783

FOREIGN PATENT DOCUMENTS

WO    2022173621 A1    8/2022

OTHER PUBLICATIONS

Tian, et al. Generalized Few-shot Semantic Segmentation, IEEE (Year: 2022).*
Boudiaf et al., "Few-Shot SegmentationWithout Meta-Learning: A Good Transductive Inference Is All You Need?", InProceedings of the IEEE/CVF conference on computer vision and pattern recognition 2021, Jun. 2021, pp. 13979-13988.
Zhang et al., "Self-Guided and Cross-Guided Learning for Few-Shot Segmentation", InProceedings of the IEEE/CVF Conference on Computer Vision and Pattern Recognition 2021, Jun. 2021, pp. 8312-8321.
Cermelli et al., "Modeling the Background for Incremental Learning in Semantic Segmentation", InProceedings of the IEEE/CVF Conference on Computer Vision and Pattern Recognition 2020, Jun. 2020, pp. 9233-9242.

(Continued)

*Primary Examiner* — John B Strege
(74) *Attorney, Agent, or Firm* — CHIP LAW GROUP

(57)    ABSTRACT

A computer-implemented method for semantic segmentation includes constructing a co-occurrence table that includes co-occurrences of predictions of a pre-trained model for base classes and labels for novel classes from the pre-trained model for base classes and from training data with novel classes. Classifiers are trained that associated with a base class and that classify an input into the base class and one of the novel classes that have co-occurrences with the base class according to the co-occurrence. A prediction is fused from the pre-trained model and the trained classifiers to obtain a final prediction result as a fully labeled image.

20 Claims, 7 Drawing Sheets

(56) References Cited

OTHER PUBLICATIONS

Tian et al., "Prior Guided Feature Enrichment Network for Few-Shot Segmentation", IEEE Transactions on Pattern Analysis and Machine Intelligence, vol. 44, No. 2, Feb. 2022, pp. 1050-1065.

Wang et al., "PANet: Few-Shot Image Semantic Segmentation with Prototype Alignment", In Proceedings of the IEEE/CVF international conference on computer vision 2019, Oct. 2019, pp. 9197-9206.

Zhang et al., "CANet: Class-Agnostic Segmentation Networks with Iterative Refinement and Attentive Few-Shot Learning", InProceedings of the IEEE/CVF conference on computer vision and pattern recognition 2019, Oct. 2019, pp. 5217-5226.

Yang et al., "Free Lunch for Few-Shot Learning: Distribution Calibration", arXiv:2101.06395v3 [cs.LG] Aug. 15, 2021, pp. 1-13.

Shi et al., "ARNET: Active-Reference Network for Few-Shot Image Semantic Segmentation", In2021 IEEE International Conference on Multimedia and Expo (ICME) Jul. 5, 2021, pp. 1-6.

Liu et al., "CRNet: Cross-Reference Networks for Few-Shot Segmentation", arXiv:2003.10658v1 [cs.CV] Mar. 24, 2020, pp. 1-9.

Dong et al., "Few-Shot Semantic Segmentation with Prototype Learning", In BMVC Sep. 2018 (vol. 3, No. 4), pp. 1-14.

Liu et al., "Learning Orthogonal Prototypes for Generalized Few-shot Semantic Segmentation", InProceedings of the IEEE/CVF Conference on Computer Vision and Pattern Recognition 2023, Jun. 2023, pp. 11319-11328.

Xing et al., "Few-Shot Image Segmentation Based on Dual Comparison Module and Sequential k-Shot Integration", in International Journal of Computational Intelligence Systems. Jan. 1, 2021, pp. 886-895.

Liu et al., "Harmonizing Base and Novel Classes: A Class-Contrastive Approach for Generalized Few-Shot Segmentation", arXiv:2303.13724v1 [cs.CV] Mar. 24, 2023, pp. 1-15.

Lang et al., "Learning What Not to Segment: A New Perspective on Few-Shot Segmentation", In Proceedings of the IEEE/CVF conference on computer vision and pattern recognition 2022, Jun. 2022, pp. 8057-8067.

Hajimiri et al., "A Strong Baseline for Generalized Few-Shot Semantic Segmentation", InProceedings of the IEEE/CVF Conference on Computer Vision and Pattern Recognition 2023, Jun. 2023, pp. 11269-11278.

Tian et al., "Generalized Few-shot Semantic Segmentation", In Proceedings of the IEEE/CVF Conference on Computer Vision and Pattern Recognition 2022, Jun. 2022, pp. 11563-11572.

International Search Report issued in corresponding Application No. PCT/EP2024/073026 dated Nov. 13, 2024 (pp. 1-4).

Mensink et al., (Jun. 23, 2014), "COSTA: Co-Occurrence Statistics for Zero-Shot Classification", 2014 IEEE Conference on Computer Vision and Pattern Recognition (pp. 2441-2448).

Catalano et al., (Apr. 12, 2023), "Few Shot Semantic Segmentation: a review of methodologies and open challenges", arxiv.org, Cornell University Library (pp. 1-32).

Wu et al., (Aug. 6, 2021), "Learning Meta-class Memory for Few-Shot Semantic Segmentation", arxiv.org, Cornell University Library (pp. 1-10).

"26th Information-Based Learning Theory Workshop", IBIS2023, Kitakyushu International Conference Centre, retrieved from web dated Sep. 13, 2023, 2 pages.

* cited by examiner

Prediction of pre-trained model for base class - 302

| 1 | 0 | 0 |
|---|---|---|
| 1 | 1 | 0 |
| 1 | 1 | 0 |

Prediction of Classifier 1
304

| | 0 | 0 |
|---|---|---|
| | 1 | 16 |
| | 1 | 16 |

Final Prediction
306

| 1 | 0 | 0 |
|---|---|---|
| 1 | 1 | 16 |
| 1 | 1 | 16 |

| Selected Base Class | Corresponding Novel Class | Corresponding Classifier |
|---|---|---|
| 0 | 16, 17, 19, 20 | Classifier 1 |
| 2 | 18 | Classifier 2 |

208

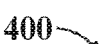

COMPUTER 401

PROCESSOR SET 410

PROCESSING CIRCUITRY 420                    CACHE 421

COMMUNICATION FABRIC 411

VOLATILE MEMORY 412

PERSISTENT STORAGE 413

OPERATING SYSTEM 422

CASCADE FEW-SHOT SEMANTIC
SEGMENTATION -500

PERIPHERAL DEVICE SET 414

UI DEVICE SET 423          STORAGE 424          IoT SENSOR SET 425

NETWORK MODULE 415

WAN 402

END USER DEVICE 403

REMOTE SERVER 404

REMOTE DATABASE 430

PRIVATE CLOUD 406

GATEWAY 440

PUBLIC CLOUD 405

CLOUD ORCHESTRATION MODULE 441          HOST PHYSICAL MACHINE SET 442

VIRTUAL MACHINE SET 443          CONTAINER SET 444

FIG. 5

CASCADE APPROACH TO FEW-SHOT SEMANTIC SEGMENTATION

BACKGROUND

The present invention generally relates to image classification using artificial intelligence, and more particularly to system and methods for concurrently classifying or segmenting objects in images into base and novel categories.

Deep learning models need to be trained on a large number of training examples of a class to recognize samples from that class. In many real-world settings, a large number of labeled examples are not available for all the classes. In these cases, the standard deep learning model will not perform well for classes with few training examples.

Visual inspection plays a crucial role in many industries. Semantic segmentation is useful for, e.g., manufacturing processes, self-driving cars and other machine learning tasks. Semantic segmentation associates a label or category with every pixel in an image. This is employed to recognize a collection of pixels that form an object that can be classed in a distinct category. Standard learning methods require a large amount of labeled data to train models. This becomes more onerous as the labeled data need to be accurately annotated for the best results.

Therefore, a need exists for semantic segmentation that permits the identification of novel features in images with fewer training samples. A further need exists for few-shot semantic segmentation that classifies a novel feature more accurately and with fewer computer resources. In addition, a need exists for few-shot semantic segmentation that classifies novel and base features simultaneously.

SUMMARY

In accordance with an embodiment of the present invention, a computer-implemented method for semantic segmentation includes constructing a co-occurrence table that includes co-occurrences of predictions of a pre-trained model for base classes and labels for novel classes from the pre-trained model for base classes and from training data with novel classes. Classifiers are trained that are associated with a base class and that classify an input into the base class and one of the novel classes that have co-occurrences with the base class according to the co-occurrence. A prediction is fused from the pre-trained model and the trained classifiers to obtain a final prediction result as fully labeled data. The fully labeled data can include an image and the final prediction results can be generated for novel and base classes concurrently. This reduces computer processing time. By including additionally trained classifiers, novel features are more accurately identified with less labeled training data.

In accordance with an embodiment of the present invention, a computer program product for semantic segmentation, where the computer program product includes a computer readable storage medium having program instructions embodied therewith. The program instructions are executable by a computer to cause the computer to construct a co-occurrence table that includes co-occurrences of predictions of a pre-trained model for base classes and labels for novel classes from the pre-trained model for base classes and from training data with novel classes; train one or more classifiers associated with a base class and that classifies an input into the base class and one of the novel classes that have co-occurrences with the base class according to the co-occurrence table; and fuse a prediction from the pretrained model and the one or more classifiers to obtain a final prediction result as a fully labeled image. The fully labeled image is generated for novel and base classes concurrently, which reduces computer processing time. By including additionally trained classifiers, novel features are more accurately identified with less labeled training data.

In accordance with an embodiment of the present invention, a system for semantic segmentation includes a hardware processor and a memory coupled to the processor. The memory stores a co-occurrence table that includes co-occurrences of predictions of a pre-trained model for base classes and labels for novel classes from the pre-trained model for base classes and from training data with novel classes. One or more classifiers are associated with a base class and classify an input into the base class and one of the novel classes that have co-occurrences with the base class according to the co-occurrence table. The hardware processor generates a final prediction result by fusing pixel labels from the pre-trained model with new results from predictions from the one or more classifiers to achieve a fully labeled image. The fully labeled image is generated for novel and base classes concurrently. This reduces computer processing time. By including additionally trained classifiers, novel features are more accurately identified with less labeled training data.

These and other features and advantages will become apparent from the following detailed description of illustrative embodiments thereof, which is to be read in connection with the accompanying drawings.

BRIEF DESCRIPTION OF THE DRAWINGS

The following description will provide details of preferred embodiments with reference to the following figures wherein:

FIG. 5 is a block diagram showing a computer system for implementing a segmentation method, in accordance with an embodiment of the present invention;

DETAILED DESCRIPTION

Figure 1:
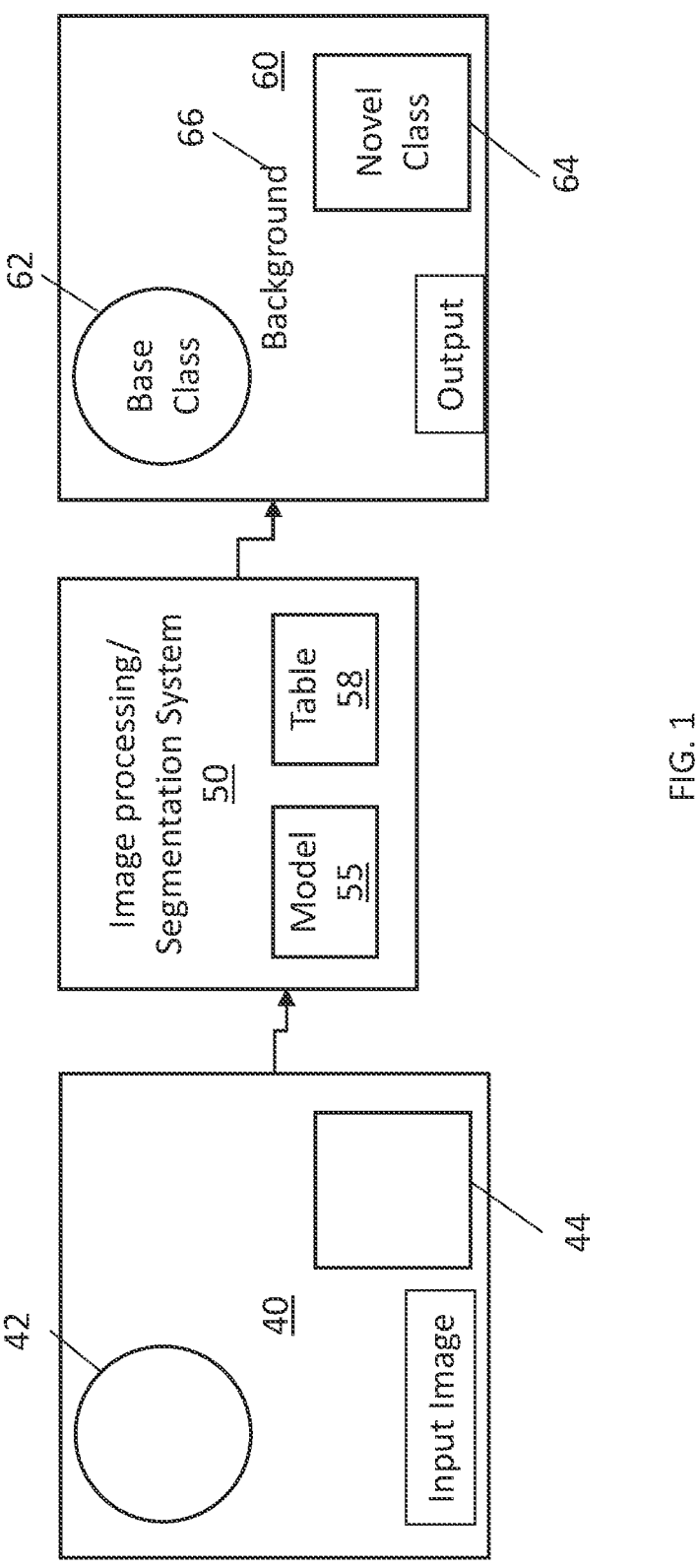
FIG. 1 is a block diagram showing an image processing system, in accordance with an embodiment of the present invention.

In accordance with embodiments of the present invention, few-shot learning (FSL) methods and systems are provided that reduce annotation costs and enable an early start on practical implementations. FSL models are trained on base classes that have many training samples. Novel classes, that have very few training samples, are employed to evaluate these models. FSL methods use the features extracted by the model trained on the base classes to evaluate the model on the novel classes. Embodiments of the present invention provide few-shot semantic segmentation by classifying base classes and novel classes with K-shot labels, concurrently. This is in contrast to few-shot semantic segmentation methods that detect novel classes only.

In accordance with one embodiment, a table is created to record a number of co-occurrences of base and novel classes in training data. The table is then employed for training multiple new classifiers, where each classifier is associated with one of the base classes. Classification is performed again using a set of newly created classifiers using the co-occurrence information. If the predicted base class is not relevant, prediction of a model for base classes is simply employed. If a co-occurrence is identified, the result can be fused to obtain a better identification of the class for a given result for novel classes.

In a particularly useful embodiment, computer-implemented methods for semantic segmentation include feeding an image into a pre-trained model which classifies each pixel of an input into one of two or more base classes including a background class for background pixels. This is a first result which classifies each pixel of the image. The classification categories depend on the training data and can for purposes of illustration include anything, such as sky, water, ocean, cloud, etc.

If a pixel has a high probability of co-occurring in a base class and a novel class, then a classifier is selected which classifies each pixel of an input into the base class and one of novel classes. After the classifier is selected, the pixel of the image is fed into the selected classifier to obtain a second classification result for the pixel. First results for all pixels of the image and any second results for any pixels are fused by replacing the first result with the second result for the same pixel. A final prediction for classifying image pixels is provided using the fused result. The final prediction is obtained in reduced time and has a greater accuracy than prior art segmentation methods.

In one embodiment, a determination for higher probability of co-occurrence is performed by counting a number of pixel-based co-occurrences in the base class and each new class within a training dataset including K images and corresponding labels for N new classes. The classifier is prepared for a top-k co-occurred pair for each new class, where k is predefined or determined by held-out data. Embodiments of the present invention enable concurrent classification of both base and novel classes.

In particularly useful embodiments, a computer-implemented method for semantic segmentation includes constructing a co-occurrence table that includes co-occurrences of predictions of a pre-trained model for base classes and labels for novel classes from the pre-trained model for base classes and from training data with novel classes. One or more classifiers associated with a base class are trained that classify an input into the base class and one of the novel classes that have co-occurrences with the base class according to the co-occurrence table. A prediction is fused from the pre-trained model and the one or more classifiers to obtain a final prediction result as fully labeled data.

The fully labeled data can include a fully labeled image which has both novel and based classes classified and labeled. The prediction results fusion includes predicting base classes and novel classes concurrently. This saves time and computing resources by providing a complete prediction result as opposed to a result with only novel classes. The co-occurrence table can be constructed by counting a number of data points (or pixels) having a prediction of the pre-trained model for a base class and a label for a novel class. Other criteria for constructing the co-occurrence table are also contemplated. The one or more classifiers can be selected to be trained by a plurality of different methods, e.g., by using a number of top co-occurred pairs for each novel class, if a value of co-occurrence in the co-occurrence table exceeds a threshold, by considering co-occurrences if a softmax probability of the pre-trained model for base classes exceeds a threshold and/or by decomposing training data into subsets and employing at least one ensemble method to train classifiers using the subsets. The one or more classifiers can be selected by these method, combinations of these methods or combinations or these and other methods.

The computer-implemented methods, in accordance with embodiments of the present invention, can be included in a computer program product for semantic segmentation. The computer program product includes a computer readable storage medium having program instructions embodied therewith, the program instructions are executable by a computer to cause the computer to perform the steps of the computer-implemented method.

In accordance with other embodiments, a system for semantic segmentation includes a hardware processor and memory coupled to the processor. The memory stores a co-occurrence table that includes co-occurrences of predictions of a pre-trained model for base classes and labels for novel classes from the pre-trained model for base classes and from training data with novel classes. The memory also stores one or more classifiers associated with a base class to classify an input into the base class and one of the novel classes that have co-occurrences with the base class according to the co-occurrence table. The hardware processor generates a final prediction result by fusing pixel labels from the pre-trained model with new results from predictions from the one or more classifiers to achieve fully labeled data. By increasing the accuracy with fewer training samples for novel classes by employing new classifiers, computation time and computer resource usage is significantly reduced.

The co-occurrence table can include a count of data points having a prediction of the pre-trained model for a base class and a label for a novel class. One or more classifiers are selected to be trained based on a number of top co-occurred pairs for each novel class, based on whether a value of co-occurrence in the co-occurrence table exceeds a threshold, based on whether a softmax probability of the pre-trained model of base classes exceeds a threshold, and/or based on an ensemble method to train classifiers.

Referring now to the drawings in which like numerals represent the same or similar elements and initially to FIG. 1, a high level diagram is shown for a few-shot learning system 20 in accordance with an embodiment of the present invention. Image segmentation is a method of dividing a digital image into subgroups called image segments to reduce complexity of the image and to enable further processing or analysis of each image segment or object. Segmentation is the process of assigning labels to pixels to identify objects, people, or other important elements in the image. Image segmentation can be employed to detect objects in an image. Image segmentation finds objects of interest in the image.

For simplicity, there are two sets of classes for objects in an image, base classes and novel classes. The base classes have many labeled training examples, whereas the novel classes have very few training examples. An image processing/segmentation system 50 includes one or more trained neural network models 55. The model 55 is trained on the base classes and evaluated on novel class episodes. Each novel class episode includes a few novel classes, a set of few support/training examples per class, and a set of query/test examples. The objective of the system 50 is to use the few support examples per novel class to classify the query examples in the novel episode.

Image processing/segmentation system 50 can be employed in a plurality of different fields of endeavor. Some examples can include self-driving vehicles, product inspection systems, image processing, security surveillance, face recognition systems, etc. Image processing/segmentation system 50 can be employed in a computer vision task where each pixel in an image is classified into a class or object to produce a dense pixel-wise segmentation map of an image. Each pixel is assigned to a specific class or object.

An input image 40 can be input to the image processing system 50. The input image 40 can include extracted features. The extracted feature space learned by the model 55, trained on the base class images, is used to help classify novel class query examples 42, 44. The model trained on the base classes is used to extract features for the support examples of the novel classes in the episode and build a classifier using the extracted features. The class for each query image is predicted by finding a nearest class prototype to the query image. However, the representation space learned using the base class images alone may not properly model the class boundaries of the novel classes since there may not be enough novel class training examples to optimize the features properly for the novel classes. Therefore, in this feature space, the features will be more discriminative for the base classes and will not be generic enough to be equally discriminative for the novel classes.

In accordance with embodiments of the present invention, to provide additional information about novel classes to better predict or classify a segmented image, a co-occurrence table 58 is employed. The co-occurrence table identifies possible pixels related to novel classes and employs additional classifiers trained based on the co-occurrences. The additional classifiers provide a classification scheme that offers the possibility that the pixel could be classified other than in a base class. The pixel is then retested and the pixel's classification is updated if certain criteria is met. This additional classification offers a way of improving the few-shot classification performance on the novel classes. In this way, an output 60 can provide a faster and more accurate classification of base classes 62 (which can include background 66) and novel classes 64.

It should be noted that preprocessing independent of input images can be used for features obtained from the pretrained model 104 for base classes to train classifiers as will be described and to run inference of the trained classifiers.

Figure 2:
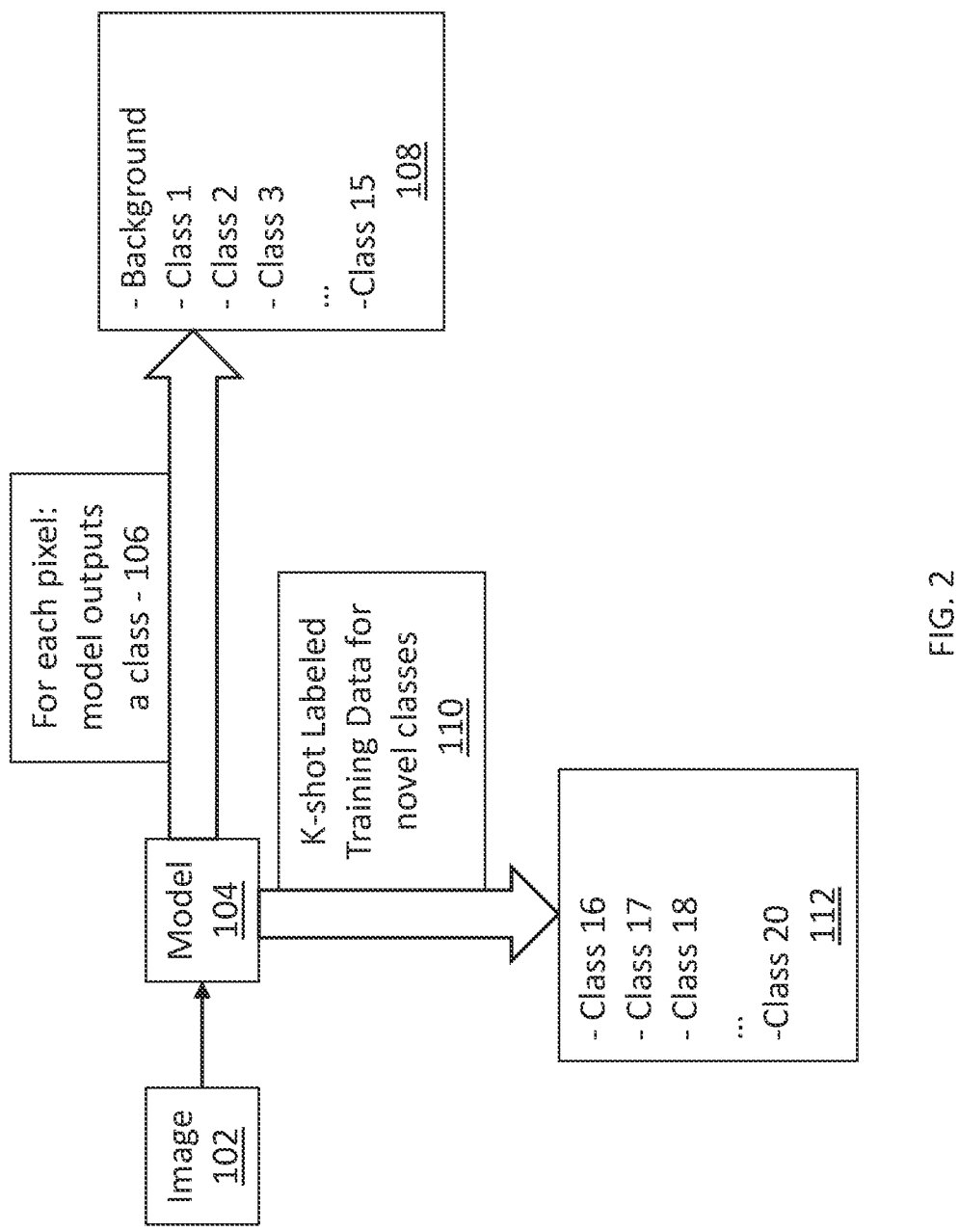
FIG. 2 is a block diagram showing class outputs from a pre-trained model for base classes and from training data for novel classes, in accordance with an embodiment of the present invention.

Referring to FIG. 2, a pre-trained model 104 is trained using image data 102. In block 106, the model 104 classifies each pixel into base classes. In block 108, the base classes include background (class 0) and one of a plurality of other base classes (e.g., classes 1-15 in this example). Examples of base classes can include, e.g., background pixels, common objects, such as, the sky, clouds, etc. Using the labeled data employed to train the model 104, K-shot images are classified for novel classes in block 110. In the present example, K is selected to be 5 and the number of novel classes is 5; therefore the number of images for training the novel classes is 25 (K times the number of novel classes=5×5=25). Adding to the number of base classes (0-15), the novel classes become classes 16-20 in block 112.

Figure 3:
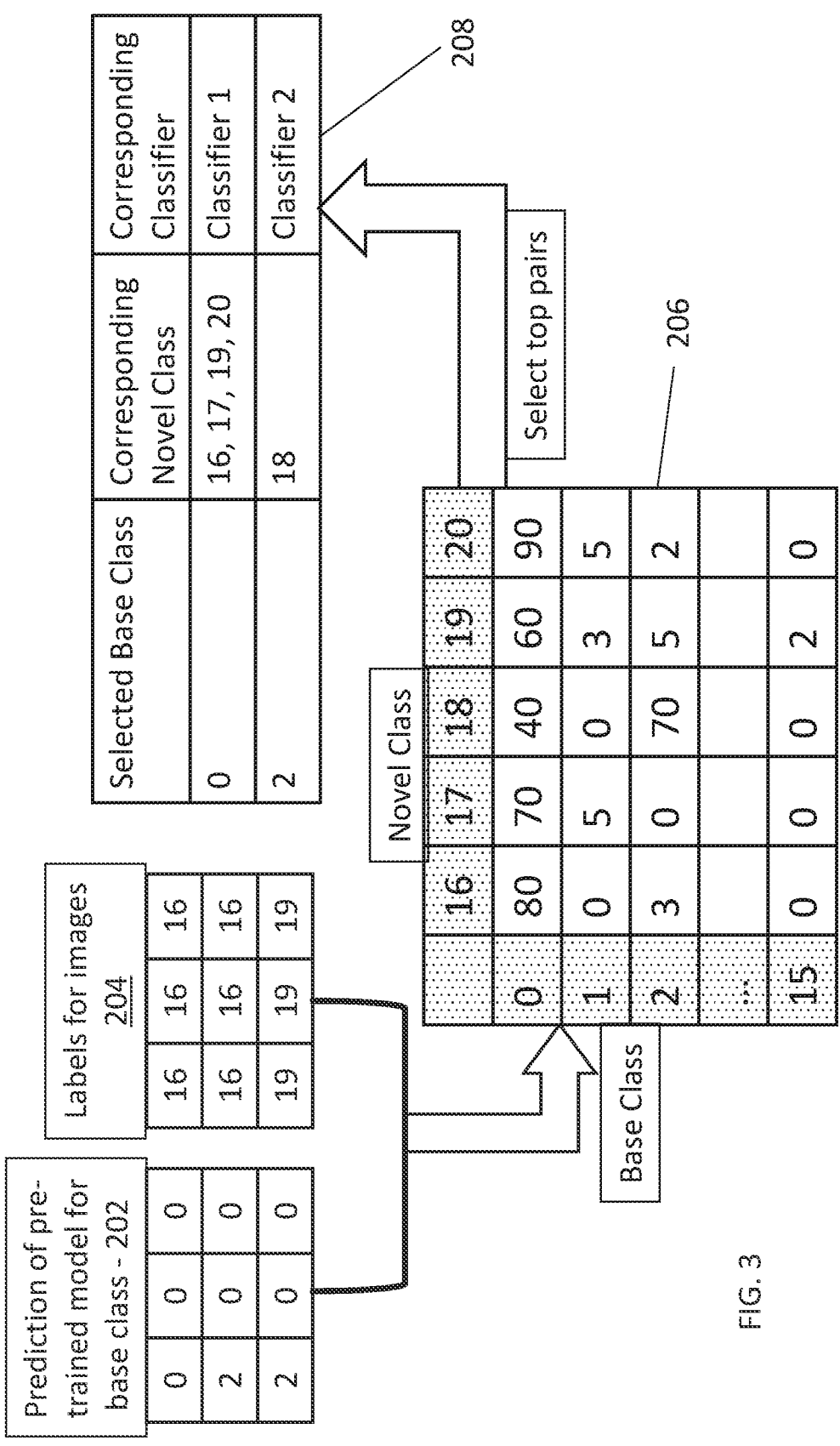
FIG. 3 is a block diagram showing construction of a co-occurrence table, in accordance with an embodiment of the present invention.

Referring to FIG. 3, during a training phase, counts for a number of co-occurrences of each base class (detected by the base model 104) and novel classes using the training dataset are tallied. A co-occurrence can be defined by one or more determination criteria. For example, one criterion can include a discrepancy in the classification of a pixel. Another criterion can include a pixel classified in a base class (including background) but labeled in a novel class. Another criterion can include a softmax probability. Other examples can include using decomposed data for an ensemble learning method.

In one embodiment, co-occurrence criteria includes a pixel classified in a base class but labeled in a novel class. For an input image, pixels are evaluated. A table of predicted base classes 202 shows nine pixels, seven of which are classified as background (class 0) and two pixels are classified in class 2. A table of labels for images 204 shows for the same nine pixels, six are classified as novel class 16 and three pixels are classified as novel class 19. Counts are generated for all pixels and a counts table 206 is generated where a predicted base class from table 202 and labels from table 204 are accumulated along columns (base classes) and rows (novel classes).

A table of co-occurrence 208 can be constructed by selecting top-k pairs for each novel class. Here, the highest counts occur at top-k pairs (base class: novel class): (0, 16), (0, 17), (2, 70), (0, 80), (0, 90). The table of co-occurrence 208 includes selected base class and corresponding novel classes.

In another embodiment, the table of co-occurrence 208 can be constructed by removing counts from table 206 where the number of co-occurrence is less than a threshold. The threshold can be predefined, determined by validation data, determined by computing resources or some other criteria. In this example, if the threshold is selected to be "50", all the cells in the table 206 would be removed except for (base class: novel class): (0, 16), (0, 17), (2, 70), (0, 80), (0, 90), which yields the same result as above. In another example, conditions of when to memorize a co-occurrence during training can include whether a percentage of the pixels is larger than a predefined threshold or not, e.g., if pixels of base class 0 and novel class 15 comprise less than 5% (threshold) of the total pixels, the cooccurrence can be ignored.

In accordance with the table of co-occurrence 208, classifiers are trained for each row of the table. The classifiers can be trained using the training dataset based upon the selected base classes, the corresponding novel classes or both. Features extracted from the pretrained model (104) for base classes 0 and 2 are used for training classifiers 1 and 2. In this example, classifier 1 is trained with labeled data for novel classes 16, 17, 19, 20. Classifier 1 classifies a pixel into background and one of the novel classes 16, 17, 19, 20.

Classifiers can be trained using any suitable training method. The training method for classifiers can be combined or modified as needed depending on data and training methods. Each classifier can include an algorithm that automatically orders or categorizes data into one or more of a set of classes. Each classifier algorithm includes rules to classify data. A classification model is trained using these classifiers to classify novel objects. Classifiers can include one or more of decision tree classifiers, naive bayes classifiers, k-nearest neighbors classifiers, support vector machines, artificial neural networks, etc.

In one embodiment, to train classifiers, preprocessing can be employed that is different from the preprocessing techniques used in training the pretrained model 104. For example, a power transformation method can be employed. Power transformation includes converting a variable by applying a specific function to the variable and training the classifier using the updated values, e.g., x becomes $x^\beta$. In one embodiment, $\beta=0.5$ is a default value which is effective in few-shot learning methods.

In another instance, a transformation known as "Tuekey's Ladders of Power Transformation" can be employed—if $\beta=0$, the log function is applied, i.e., log (x). Another approach to determining $\beta$ uses validation data. Other than the power transformation, for example, standardization and/or normalization functions can be used. For example, a standardization function can include, e.g., $(x-\mu)/\sigma$, where $\mu$ is a mean and $\sigma$ is a standard deviation. A normalization function can include, e.g., min-max feature scaling: $(x-x_{min})/(x_{max}-x_{min})$, where $x_{max}$ is a maximum value of the variable x and $x_{min}$ is a minimum value of the variable x.

In an alternate embodiment, ensemble learning can be employed to train new classifiers, e.g., when K>1. Ensemble learning is a machine learning approach that seeks better predictive performance by combining the predictions from multiple models. Ensemble learning can be used for training classifiers. A classifier can be trained with K-shot data. K-shot training data can be decomposed (e.g., split) into multiple one-shot (or less than K-shot). The K-shot data can be decomposed into one-shot (or less than K-shot) data. In one embodiment, the decomposition can include K-shot data that are decomposed to five one-shot data by simple splitting. Several combinations are possible, e.g., five-shot data are decomposed to two-shot and three-shot data or one-shot and two two-shot data.

The decomposition is not limited to a shot-wise manner. For example, data or an image can be divided in a number of ways. In one example, an image can be divided into two by a horizontal cut. Then, the top half and bottom half can each be used for training a different classifier.

Multiple classifiers can be trained for each decomposed training data and original K-shot training data, and then the predictions from these two sources and/or other sources can be combined or fused by (weighted) ensemble. For example, another source can include softmax outputs.

The weight for ensemble can include predefined values or computed by held out data. For example, cross-validation can be used to determine which source has better predictive capabilities. Also, K-shot data can be resampled, and ensemble learning can be applied to the resampled datasets.

The trained classifiers by any method are added as the classifiers identified in co-occurrence table 208 and are employed to improve performance. The additional classifiers are employed to provide a second (or more) prediction and improve accuracy and speed as described.

In another embodiment, softmax outputs of the pretrained model for base classes can be used for constructing the co-occurrence table 208. The softmax function or softargmax converts a vector of real numbers into a probability distribution of possible outcomes. Softmax is a normalized exponential function that can generalize a logistic function to multiple dimensions. Softmax is employed as a last activation function of a neural network to normalize the output of a network to a probability distribution over predicted output classes.

In one example, co-occurrence events for co-occurrence table 208 may not be considered if the softmax probability of the pretrained model is smaller than a predefined threshold. The threshold can be set based on historic data, preference, predefined value, computed by held-out data or any other meaningful criteria. Weights for weighted averages of softmax outputs of the classifiers can be computed during training of classifiers. In the inference phase, the weighted averages of the softmax outputs can be employed to determine an alternative predicted value by fusion of predictions of the pretrained model and the trained classifiers. In other embodiments, other aggregation methods may be employed, e.g., majority voting.

Figure 4:
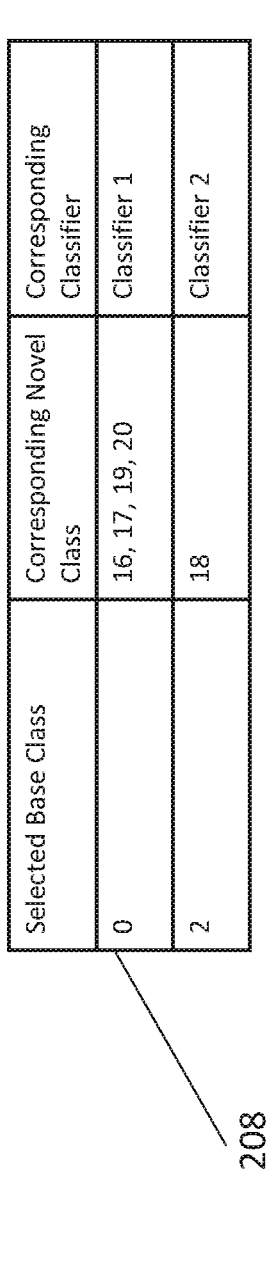
FIG. 4 is a block diagram showing fusion of prediction results to provide a final prediction of a fully labeled image, in accordance with an embodiment of the present invention.

Referring to FIG. 4, during an inference phase, a prediction for each pixel is obtained from the pretrained model for base classes. A table 302 for predictions of the pre-trained model for base classes shows predicted classes for each of nine illustrative pixels. Four pixels are classed as background (class 0) while five pixels are classed in base class 1. The co-occurrence table 208 is referred to. If a prediction of a pixel in table 302 matches a selected base class in table 208, a corresponding trained classifier is run to obtain a new prediction. Since table 302 includes base classes 0 and 1, pixels with base class 0 are run with classifier 1, and pixels with class 1 are accepted as is (base class 1). A table 304 shows predictions of classifier 1 on the same pixels in table 302. The results of two pixels remain class 0 but two pixels are updated to class 16.

If the prediction of the classifier (classifier 1 in this example) in table 304 is different from the original prediction in table 302, the original prediction (table 302) of the pixel is replaced with the new prediction obtained in table 304. Hence, the final prediction is cascaded, where applicable, from the original prediction to the new prediction. A table 306 shows a final prediction for the pixels.

By employing this cascaded classification of pixels, greater improvement in accuracy and speed is achieved in accordance with embodiments of the present invention.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Referring to FIG. 5, a computing environment 400 contains an example of an environment for the execution of at least some of the computer code involved in performing the inventive methods, such as cascade few-shot semantic segmentation code 500. In addition to block 500, computing environment 400 includes, for example, computer 401, wide area network (WAN) 402, end user device (EUD) 403, remote server 404, public cloud 405, and private cloud 406. In this embodiment, computer 401 includes processor set 410 (including processing circuitry 420 and cache 421), communication fabric 411, volatile memory 412, persistent storage 413 (including operating system 422 and block 500, as identified above), peripheral device set 414 (including user interface (UI) device set 423, storage 424, and Internet of Things (IoT) sensor set 425), and network module 415. Remote server 404 includes remote database 430. Public cloud 405 includes gateway 440, cloud orchestration module 441, host physical machine set 442, virtual machine set 443, and container set 444.

COMPUTER 401 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 430. As is well understood in the art of computer technology, and depending upon the technology, performance of a computer-implemented method may be distributed among multiple computers and/or between multiple locations. On the other hand, in this presentation of computing environment 400, detailed discussion is focused on a single computer, specifically computer 401, to keep the presentation as simple as possible. Computer 401 may be located in a cloud, even though it is not shown in a cloud in FIG. 5. On the other hand, computer 401 is not required to be in a cloud except to any extent as may be affirmatively indicated.

PROCESSOR SET 410 includes one, or more, computer processors of any type now known or to be developed in the future. Processing circuitry 420 may be distributed over multiple packages, for example, multiple, coordinated integrated circuit chips. Processing circuitry 420 may implement multiple processor threads and/or multiple processor cores. Cache 421 is memory that is located in the processor chip package(s) and is typically used for data or code that should be available for rapid access by the threads or cores running on processor set 410. Cache memories are typically organized into multiple levels depending upon relative proximity to the processing circuitry. Alternatively, some, or all, of the cache for the processor set may be located "off chip." In some computing environments, processor set 410 may be designed for working with qubits and performing quantum computing.

Computer readable program instructions are typically loaded onto computer 401 to cause a series of operational steps to be performed by processor set 410 of computer 401 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 421 and the other storage media discussed below. The program instructions, and associated data, are accessed by processor set 410 to control and direct performance of the inventive methods. In computing environment 400, at least some of the instructions for performing the inventive methods may be stored in block 500 in persistent storage 413.

COMMUNICATION FABRIC 411 is the signal conduction path that allows the various components of computer 401 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

VOLATILE MEMORY 412 is any type of volatile memory now known or to be developed in the future. Examples include dynamic type random access memory (RAM) or static type RAM. Typically, volatile memory 412 is characterized by random access, but this is not required unless affirmatively indicated. In computer 401, the volatile memory 412 is located in a single package and is internal to computer 401, but, alternatively or additionally, the volatile memory may be distributed over multiple packages and/or located externally with respect to computer 401.

PERSISTENT STORAGE 413 is any form of non-volatile storage for computers that is now known or to be developed in the future. The non-volatility of this storage means that the stored data is maintained regardless of whether power is being supplied to computer 101 and/or directly to persistent storage 413. Persistent storage 413 may be a read only memory (ROM), but typically at least a portion of the persistent storage allows writing of data, deletion of data and re-writing of data. Some familiar forms of persistent storage include magnetic disks and solid state storage devices. Operating system 422 may take several forms, such as various known proprietary operating systems or open source Portable Operating System Interface-type operating systems that employ a kernel. The code included in block 500 typically includes at least some of the computer code involved in performing the inventive methods.

PERIPHERAL DEVICE SET 414 includes the set of peripheral devices of computer 401. Data communication connections between the peripheral devices and the other components of computer 401 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 423 may include components such as a display screen, speaker, microphone, wearable devices (such as goggles and smart watches), keyboard, mouse, printer, touchpad, game controllers, and haptic devices. Storage 424 is external storage, such as an external hard drive, or insertable storage, such as an SD card. Storage 424 may be persistent and/or volatile. In some embodiments, storage 424 may take the form of a quantum computing storage device for storing data in the form of qubits. In embodiments where computer 401 is required to have a large amount of storage (for example, where computer 401 locally stores and manages a large database) then this storage may be provided by peripheral storage devices designed for storing very large amounts of data, such as a storage area network (SAN) that is shared by multiple, geographically distributed computers. IoT sensor set 425 is made up of sensors that can be used in Internet of Things applications. For example, one sensor may be a thermometer and another sensor may be a motion detector.

NETWORK MODULE 415 is the collection of computer software, hardware, and firmware that allows computer 401 to communicate with other computers through WAN 402. Network module 415 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 415 are performed on the same physical hardware device. In other embodiments (for example, embodiments that utilize software-defined networking (SDN)), the control functions and the forwarding functions of network module 415 are performed on physically separate devices, such that the control functions manage several different network hardware devices. Computer readable program instructions for performing the inventive methods can typically be downloaded to computer 401 from an external computer or external storage device through a network adapter card or network interface included in network module 415.

WAN 402 is any wide area network (for example, the internet) capable of communicating computer data over non-local distances by any technology for communicating computer data, now known or to be developed in the future. In some embodiments, the WAN 402 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 403 is any computer system that is used and controlled by an end user (for example, a customer of an enterprise that operates computer 401), and may take any of the forms discussed above in connection with computer 401. EUD 403 typically receives helpful and useful data from the operations of computer 401. For example, in a hypothetical case where computer 401 is designed to provide a recommendation to an end user, this recommendation would typically be communicated from network module 415 of computer 401 through WAN 402 to EUD 403. In this way, EUD 403 can display, or otherwise present, the recommendation to an end user. In some embodiments, EUD 403 may be a client device, such as thin client, heavy client, mainframe computer, desktop computer and so on.

REMOTE SERVER 404 is any computer system that serves at least some data and/or functionality to computer 401. Remote server 404 may be controlled and used by the same entity that operates computer 401. Remote server 404 represents the machine(s) that collect and store helpful and useful data for use by other computers, such as computer 401. For example, in a hypothetical case where computer 401 is designed and programmed to provide a recommendation based on historical data, then this historical data may be provided to computer 401 from remote database 430 of remote server 404.

PUBLIC CLOUD 405 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 405 is performed by the computer hardware and/or software of cloud orchestration module 441. The computing resources provided by public cloud 405 are typically implemented by virtual computing environments that run on various computers making up the computers of host physical machine set 442, which is the universe of physical computers in and/or available to public cloud 405. The virtual computing environments (VCEs) typically take the form of virtual machines from virtual machine set 443 and/or containers from container set 444. It is understood that these VCEs may be stored as images and may be transferred among and between the various physical machine hosts, either as images or after instantiation of the VCE. Cloud orchestration module 441 manages the transfer and storage of images, deploys new instantiations of VCEs and manages active instantiations of VCE deployments. Gateway 440 is the collection of computer software, hardware, and firmware that allows public cloud 405 to communicate through WAN 402.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 406 is similar to public cloud 405, except that the computing resources are only available for use by a single enterprise. While private cloud 406 is depicted as being in communication with WAN 402, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 405 and private cloud 406 are both part of a larger hybrid cloud.

Figure 6:
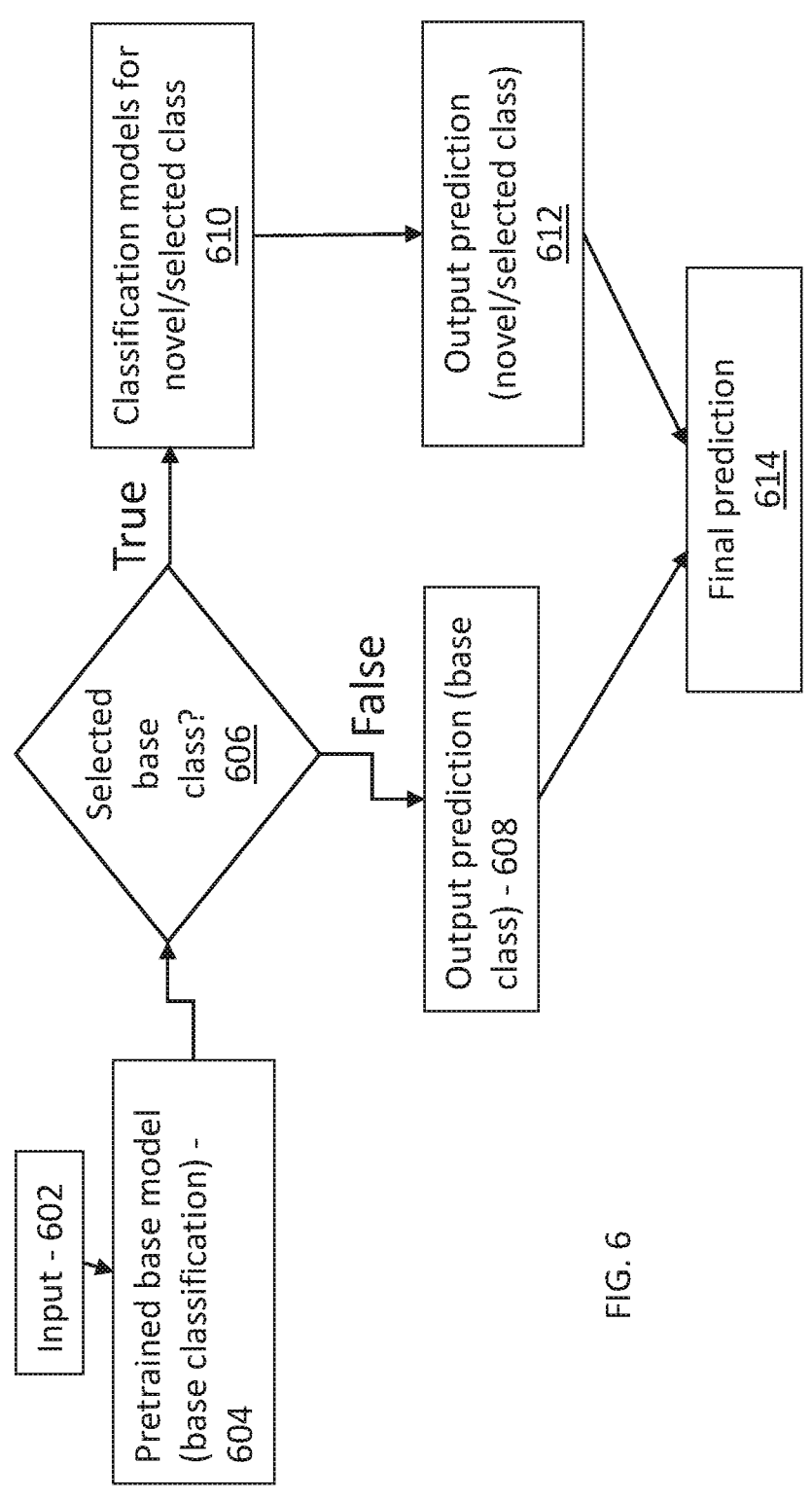
FIG. 6 is block/flow diagram showing processing of an inference, in accordance with an embodiment of the present invention.

Referring to FIG. 6, during an inference phase, an input 602 includes a digital image. The digital image can include any type of digital image, including a bar code, video photograph etc. In useful embodiments, the image can include an inspection image from a factory to check product quality, a surveillance image, a feedback image for a self-driving vehicle, an aerial image, etc. The input 602 is preprocessed to be made compatible with a pre-trained base model 604. The input 602 is fed into the pre-trained base model 604 which classifies each pixel of an input into one of two or more base classes (including background) to obtain a first prediction result for each pixel of the image.

A determination is made in block 606 as to whether the first result of a pixel of the image is in a base class with a higher probability of co-occurrence with at least one of N new classes. This determination can be made with the assistance of a co-occurrence table. In one example, the higher probability of co-occurrence with at least one of the N new classes can be computed by counting a number of pixel-based co-occurrences of the base class and each new class within a training dataset including K images and corresponding labels for the N new classes. Other criteria for determining co-occurrences are also contemplated.

If true (i.e., a higher probability of co-occurrence is determined), for the pixel of the image, a classifier is selected, in block 610, which classifies each pixel of an input into one of the selected base class and the at least one of the N new classes and the pixel of the image is fed into the selected classifier to obtain a second result for the pixel, in block 612. Classifiers can be selected/prepared for a top-k co-occurred pair for each new class, where k is predefined or determined by held-out data. Other criteria can also be applied to determine which co-occurrences will be associated with given classifiers.

If false, for the pixel of the image, an output prediction for the pixel is the base class in block 608. In block 614, the first results for all pixel of the image and at least one second result for at least one pixel are fused or combined into a final prediction for all pixels by replacing the first result with the second result (cascading) for the same pixel, in instances where a second result was obtained. In this way, the input image 602 is segmented with base and novel classes concurrently classified in the final prediction results.

Figure 7:
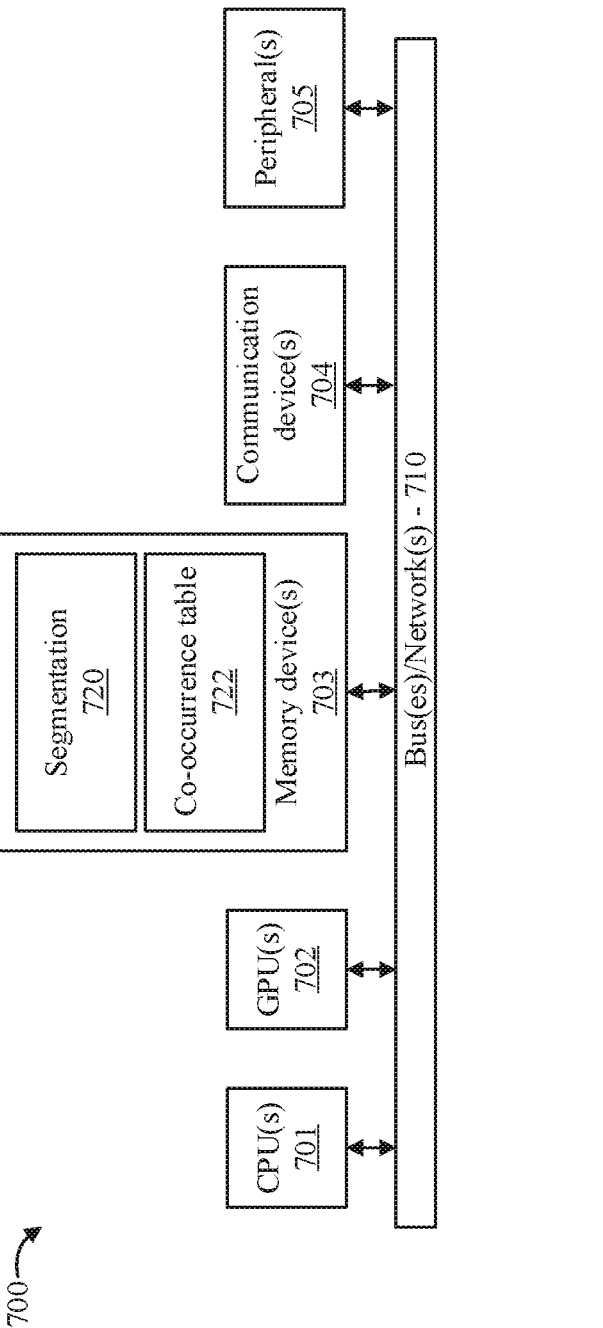
FIG. 7 is a block diagram showing a computer system for implementing a segmentation method, in accordance with an embodiment of the present invention.

Referring to FIG. 7, a block diagram shows an exemplary processing system 700, in accordance with an embodiment of the present invention. The processing system 700 includes a set of processing units (e.g., CPUs) 701, a set of GPUs 702, a set of memory devices 703, a set of communication devices 704, and set of peripherals 705. The CPUs 701 can be single or multi-core CPUs. The GPUs 702 can be single or multi-core GPUs. The one or more memory devices 703 can include caches, RAMs, ROMs, and other memories (flash, optical, magnetic, etc.). The communication devices 704 can include wireless and/or wired communication devices (e.g., network (e.g., WIFI, etc.) adapters, etc.). The peripherals 705 can include a display device, a user input device, a printer, an imaging device, and so forth. Elements of processing system 700 are connected by one or more buses or networks (collectively denoted by the figure reference numeral 710).

In an embodiment, memory devices 703 can store specially programmed software modules to transform the computer processing system into a special purpose computer configured to implement various aspects of the present invention. In an embodiment, special purpose hardware (e.g., Application Specific Integrated Circuits, Field Programmable Gate Arrays (FPGAs), and so forth) can be used to implement various aspects of the present invention.

In an embodiment, memory devices 703 store program code for implementing a semantic segmentation system 720 and co-occurrence table 722. The co-occurrence table 722 includes co-occurrences of predictions of a pre-trained model for base classes and labels for novel classes from the pre-trained model for base classes and from training data with novel classes. One or more classifiers are associated with a base class and classify an input into the base class and one of the novel classes that have co-occurrences with the base class according to the co-occurrence table 722. The hardware processor CPU 701 and/or GPU 702 generate a final prediction result by fusing pixel labels from the pre-trained model with new results from predictions from the one or more classifiers to achieve a fully labeled image.

Of course, the processing system 700 may also include other elements (not shown), as readily contemplated by one of skill in the art, as well as omitting certain elements. For example, various other input devices and/or output devices can be included in processing system 700, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized. These and other variations of the processing system 700 are readily contemplated by one of ordinary skill in the art given the teachings of the present invention provided herein. In one embodiment, peripherals 705 can include a camera for capturing digital images, e.g., product inspection images, surveillance video images, self-driving vehicle images and the like, that can be segmented by the segmentation system 720.

Moreover, it is to be appreciated that various figures as described below with respect to various elements and steps relating to the present invention that may be implemented, in whole or in part, by one or more of the elements of system 700.

By employing this cascaded classification of pixels, greater improvement in accuracy and speed is achieved in accordance with embodiments of the present invention. Embodiments of the present invention were tested and compared with state of the art systems to determine improvements in accuracy and performance. Testing measured inference time for Base, Novel and Mean (average of Base and Novel) categories in both a one-shot and a 5-shot setting. The methods of the present invention outperformed all 9 state of the art methods which it was tested against. The results were achieved on PASCAL-5i and COCO-20i data. The inference time for the embodiments of the present invention was of particular note for Novel, one-shot testing, which outperformed the state of the art systems by at least 10% and often more than that.

As employed herein, the term "hardware processor subsystem" or "hardware processor" can refer to a processor, memory, software or combinations thereof that cooperate to perform one or more specific tasks. In useful embodiments, the hardware processor subsystem can include one or more data processing elements (e.g., logic circuits, processing circuits, instruction execution devices, etc.). The one or more data processing elements can be included in a central processing unit, a graphics processing unit, and/or a separate processor- or computing element-based controller (e.g., logic gates, etc.). The hardware processor subsystem can include one or more on-board memories (e.g., caches, dedicated memory arrays, read only memory, etc.). In some embodiments, the hardware processor subsystem can include one or more memories that can be on or off board or that can be dedicated for use by the hardware processor subsystem (e.g., ROM, RAM, basic input/output system (BIOS), etc.).

In some embodiments, the hardware processor subsystem can include and execute one or more software elements. The one or more software elements can include an operating system and/or one or more applications and/or specific code to achieve a specified result.

In other embodiments, the hardware processor subsystem can include dedicated, specialized circuitry that performs one or more electronic processing functions to achieve a specified result. Such circuitry can include one or more application-specific integrated circuits (ASICs), FPGAs, and/or PLAs.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Having described preferred embodiments of systems and methods (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

The invention claimed is:

1. A computer-implemented method for semantic segmentation, the method comprising:
   constructing a co-occurrence table responsive to a determination criteria based on a counted number of pixel-based data points that includes co-occurrences of predictions of a pre-trained model for base classes and labels for novel classes from the pre-trained model for base classes and from training data with novel classes;
   training one or more classifiers associated with a base class that classifies an input into the base class and one of the novel classes that have co-occurrences with the base class according to the co-occurrence table; and
   fusing a prediction from the pre-trained model and the one or more classifiers to obtain a final prediction result as fully labeled data.

2. The computer-implemented method as recited in claim 1, wherein fusing the prediction includes predicting base classes and novel classes concurrently.

3. The computer-implemented method as recited in claim 1, wherein constructing the co-occurrence table includes counting a number of data points having a prediction of the pre-trained model for a base class and a label for a novel class.

4. The computer-implemented method as recited in claim 1, wherein training one or more classifiers includes selecting classifiers to be trained using a number of top co-occurred pairs for each novel class.

5. The computer-implemented method as recited in claim 1, wherein training one or more classifiers includes training a classifier if a value of co-occurrence in the co-occurrence table exceeds a threshold.

6. The computer-implemented method as recited in claim 1, wherein constructing a co-occurrence table includes considering co-occurrences if a softmax probability of the pre-trained model for base classes exceeds a threshold.

7. The computer-implemented method as recited in claim 1, wherein training one or more classifiers includes;
   decomposing training data into subsets; and
   employing at least one ensemble method to train classifiers using the subsets.

8. A computer program product for semantic segmentation, the computer program product comprising a non-transitory computer readable storage medium having program instructions embodied therewith, the program instructions executable by a computer to cause the computer to:
   construct a co-occurrence table responsive to a determination criteria based on a counted number of pixel-based data points that includes co-occurrences of predictions of a pre-trained model for base classes and labels for novel classes from the pre-trained model for base classes and from training data with novel classes;
   train one or more classifiers associated with a base class and that classifies an input into the base class and one of the novel classes that have co-occurrences with the base class according to the co-occurrence table; and
   fuse a prediction from the pre-trained model and the one or more classifiers to obtain a final prediction result as fully labeled data.

9. The computer program product as recited in claim 8, wherein the final prediction result includes base classes and novel classes predicted concurrently.

10. The computer program product as recited in claim 8, wherein the co-occurrence table includes a number of data points having a prediction of the pre-trained model for a base class and a label for a novel class.

11. The computer program product as recited in claim 8, wherein one or more classifiers are trained by selecting classifiers to be trained using a number of top co-occurred pairs for each novel class.

12. The computer program product as recited in claim 8, wherein one or more classifiers are trained by training a classifier if a value of co-occurrence in the co-occurrence table exceeds a threshold.

13. The computer program product as recited in claim 8, wherein the co-occurrence table is constructed by including co-occurrences of pixels if a softmax probability of the pre-trained model of base classes exceeds a threshold.

14. The computer program product as recited in claim 8, wherein the instructions cause the computer to train the one or more classifiers by:
   decomposing training data into subsets; and
   employing at least one ensemble method to train classifiers using the subsets.

15. A system for semantic segmentation, comprising:

a hardware processor; and a memory coupled to the hardware processor, the memory storing:

a co-occurrence table responsive to a determination criteria based on a counted number of pixel-based data points that includes co-occurrences of predictions of a pre-trained model for base classes and labels for novel classes from the pre-trained model for base classes and from training data with novel classes; and one or more classifiers associated with a base class to classify an input into the base class and one of the novel classes that have co-occurrences with the base class according to the co-occurrence table;

the hardware processor generates a final prediction result by fusing pixel labels from the pre-trained model with new results from predictions from the one or more classifiers to achieve fully labeled data.

16. The system as recited in claim 15, wherein the co-occurrence table includes a count of data points having a prediction of the pre-trained model for a base class and a label for a novel class.

17. The system as recited in claim 15, wherein the one or more classifiers are selected to be trained based on a number of top co-occurred pairs for each novel class.

18. The system as recited in claim 15, wherein the one or more classifiers are selected to be trained based on whether a value of co-occurrence in the co-occurrence table exceeds a threshold.

19. The system as recited in claim 15, wherein the co-occurrence table includes co-occurrences if a softmax probability of the pre-trained model of base classes exceeds a threshold.

20. The system as recited in claim 15, includes an ensemble method to train classifiers.

* * * * *